UNITED STATES PATENT OFFICE.

FRANK K. CAMERON AND JOHN A. CULLEN, OF SALT LAKE CITY, UTAH, AND REED W. HYDE, OF NEW YORK, N. Y., ASSIGNORS TO AMERICAN SMELTING & REFINING COMPANY, OF SALT LAKE CITY, UTAH, A CORPORATION OF NEW JERSEY.

PRODUCING ZINC CHLORID FROM ORES.

1,261,696.

Specification of Letters Patent.

Patented Apr. 2, 1918.

No Drawing.

Application filed July 17, 1917. Serial No. 181,167.

*To all whom it may concern:*

Be it known that we, (1) FRANK K. CAMERON, (2) JOHN A. CULLEN, and (3) REED W. HYDE, citizens of the United States, residing at (1) Salt Lake City, (2) Salt Lake City, and (3) New York city, in the counties of (1) Salt Lake, (2) Salt Lake, and (3) New York, and States of (1) Utah, (2) Utah, and (3) New York, have invented certain new and useful Improvements in Producing Zinc Chlorid from Ores, of which the following is a specification.

This invention is a novel method for producing zinc chlorid from oxid or oxidized ores containing zinc and lead. The term oxid ore is used herein to include sulfid ores which have been subjected to a dead roast.

The ore is pulverized, preferably to about 100 mesh, more or less, and is thoroughly mixed, in the dry state, with sodium or calcium chlorid in amount rather more than sufficient to provide an equivalent of chlorin for all of the metallic bases present. The dry mass is then subjected to distillation, for example in an iron retort, the volatile products consisting principally of the chlorids of lead, silver and gold being collected for subsequent treatment in any desired manner. The zinc is transformed for the most part into chlorid, which is probably basic and which is almost completely retained in the residue in the retort.

The residue is now leached with hot water, preferably containing sufficient hydrochloric acid to insure practically complete extraction of the zinc. In case there is much separation of gelatinous silica at this stage it may be desirable or necessary to evaporate the entire treated mass to dryness in order to render the silica insoluble, after which it is again treated with water or preferably with dilute hydrochloric acid.

In either case the solution containing zinc chlorid is now filtered from the insoluble gangue and is freed from iron, manganese, etc., by any of the well known methods; or if desired the zinc chlorid may be precipitated in solid form as a double halid of sodium, potassium or ammonium, by adding to the solution the corresponding alkali-metal chlorid. In either case the zinc chlorid is eventually recoverable in a state of commercial purity, either from its solution by simple evaporation; or from the double halid, previously purified if necessary by recrystallization, by decomposing the same with a strong solution of hydrochloric acid, as disclosed in our copending application Serial No. 181,169, filed July 17, 1917.

We claim:—

Method of producing zinc chlorid from oxidized zinc ores also containing lead, which consists in mixing the ore with a metal chlorid, distilling lead chlorid from the mixture, and recovering the zinc chlorid from the distillation residue by leaching.

In testimony whereof, we affix our signatures.

FRANK K. CAMERON.
JOHN A. CULLEN.
REED W. HYDE.